US008868684B2

(12) United States Patent
Gibbon et al.

(10) Patent No.: US 8,868,684 B2
(45) Date of Patent: Oct. 21, 2014

(54) TELEPRESENCE SIMULATION WITH MULTIPLE INTERCONNECTED DEVICES

(75) Inventors: David C. Gibbon, Lincroft, NJ (US); Lee Begeja, Gillete, NJ (US); Zhu Liu, Marlboro, NJ (US); Bernard S. Renger, New Providence, NJ (US); Behzad Shahraray, Holmdel, NJ (US); Eric Zavesky, Hoboken, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 274 days.

(21) Appl. No.: 13/162,962

(22) Filed: Jun. 17, 2011

(65) Prior Publication Data

US 2012/0324054 A1 Dec. 20, 2012

(51) Int. Cl.
*G06F 15/16* (2006.01)
*H04L 29/06* (2006.01)

(52) U.S. Cl.
CPC .............. *H04L 69/14* (2013.01); *H04L 69/24* (2013.01); *H04L 65/403* (2013.01); *H04L 67/38* (2013.01); *H04L 65/1069* (2013.01); *Y02B 60/33* (2013.01)
USPC ............................................ 709/218; 348/47

(58) Field of Classification Search
None
See application file for complete search history.

(56) References Cited

U.S. PATENT DOCUMENTS

| | | | |
|---|---|---|---|
| 6,359,647 B1 * | 3/2002 | Sengupta et al. | 348/154 |
| 7,705,890 B2 * | 4/2010 | Shin et al. | 348/220.1 |
| 8,248,482 B2 * | 8/2012 | Oks et al. | 348/222.1 |
| 8,300,890 B1 * | 10/2012 | Gaikwad et al. | 382/103 |
| 2001/0019360 A1 * | 9/2001 | Tanaka et al. | 348/211 |
| 2003/0071902 A1 * | 4/2003 | Allen et al. | 348/211.11 |
| 2003/0202099 A1 * | 10/2003 | Nakamura et al. | 348/153 |
| 2004/0027460 A1 * | 2/2004 | Morita | 348/211.99 |
| 2004/0061789 A1 * | 4/2004 | Uehara et al. | 348/222.1 |
| 2005/0129111 A1 * | 6/2005 | Kurceren et al. | 375/240.03 |
| 2005/0201723 A1 * | 9/2005 | Islam et al. | 386/52 |
| 2005/0237376 A1 | 10/2005 | Roessler et al. | |
| 2006/0098899 A1 * | 5/2006 | King et al. | 382/305 |
| 2006/0152592 A1 * | 7/2006 | Chishima et al. | 348/211.3 |
| 2007/0039030 A1 * | 2/2007 | Romanowich et al. | 725/105 |
| 2007/0182818 A1 * | 8/2007 | Buehler | 348/143 |
| 2008/0218612 A1 * | 9/2008 | Border et al. | 348/262 |
| 2008/0218613 A1 * | 9/2008 | Janson et al. | 348/262 |
| 2008/0225119 A1 * | 9/2008 | Murata | 348/153 |
| 2008/0244149 A1 * | 10/2008 | Chu | 710/313 |
| 2008/0246835 A1 * | 10/2008 | Tian | 348/14.12 |
| 2009/0207234 A1 | 8/2009 | Chen et al. | |
| 2009/0287837 A1 * | 11/2009 | Felsher | 709/229 |
| 2009/0287849 A1 * | 11/2009 | Mumick et al. | 709/248 |
| 2009/0300685 A1 * | 12/2009 | Easter | 725/62 |
| 2010/0149306 A1 | 6/2010 | Gopal et al. | |
| 2010/0174844 A1 * | 7/2010 | Chu | 710/313 |
| 2010/0214391 A1 | 8/2010 | Graham et al. | |
| 2010/0245532 A1 * | 9/2010 | Kurtz et al. | 348/14.03 |

(Continued)

*Primary Examiner* — Ninos Donabed
(74) *Attorney, Agent, or Firm* — Greenblum & Bernstein P.L.C.

(57) ABSTRACT

Telepresence is coordinated among multiple interconnected devices. The presence of a first interconnected device and a second interconnected device in a common space is determined. Multimedia capabilities of the first interconnected device and the second interconnected device are determined. Communications of at least one type of media information using one of the first interconnected device and the second interconnected device are selectively and temporarily enabled by an external controller over a second network. Communications of the at least one type of media information using the other of the first interconnected device and the second interconnected device are selectively and temporarily not enabled by the external controller over the second network.

19 Claims, 6 Drawing Sheets

(56) References Cited

U.S. PATENT DOCUMENTS

2010/0271490 A1* 10/2010 Jung et al. .................. 348/207.1
2011/0040588 A1    2/2011  Durocher et al.
2011/0069173 A1*  3/2011  Hazzani ........................ 348/159
2011/0154266 A1*  6/2011  Friend et al. .................. 715/863
2011/0267471 A1* 11/2011 Lee et al. ...................... 348/159
2012/0105687 A1*  5/2012  Nanu et al. .................... 348/241
2012/0198347 A1*  8/2012  Hirvonen et al. ............. 715/738
2012/0231817 A1*  9/2012  Holm et al. ................ 455/456.3

* cited by examiner

TELEPRESENCE SIMULATION WITH MULTIPLE INTERCONNECTED DEVICES

BACKGROUND

1. Field of the Disclosure

The present disclosure relates to telepresence. More particularly, the present disclosure relates to coordinating multiple devices to form an individual telepresence point.

2. Background Information

Telepresence allows users to simulate their presence at a location other than their true location by communicating over networks. Examples of telepresence use include audio conferences and video conferences, where audio and video input from individuals and groups can be captured and transmitted to locations other than their true location so as to simulate their presence at the other locations.

DETAILED DESCRIPTION

In view of the foregoing, the present disclosure, through one or more of its various aspects, embodiments and/or specific features or sub-components, is thus intended to bring out one or more of the advantages as specifically noted below.

Figure 1:
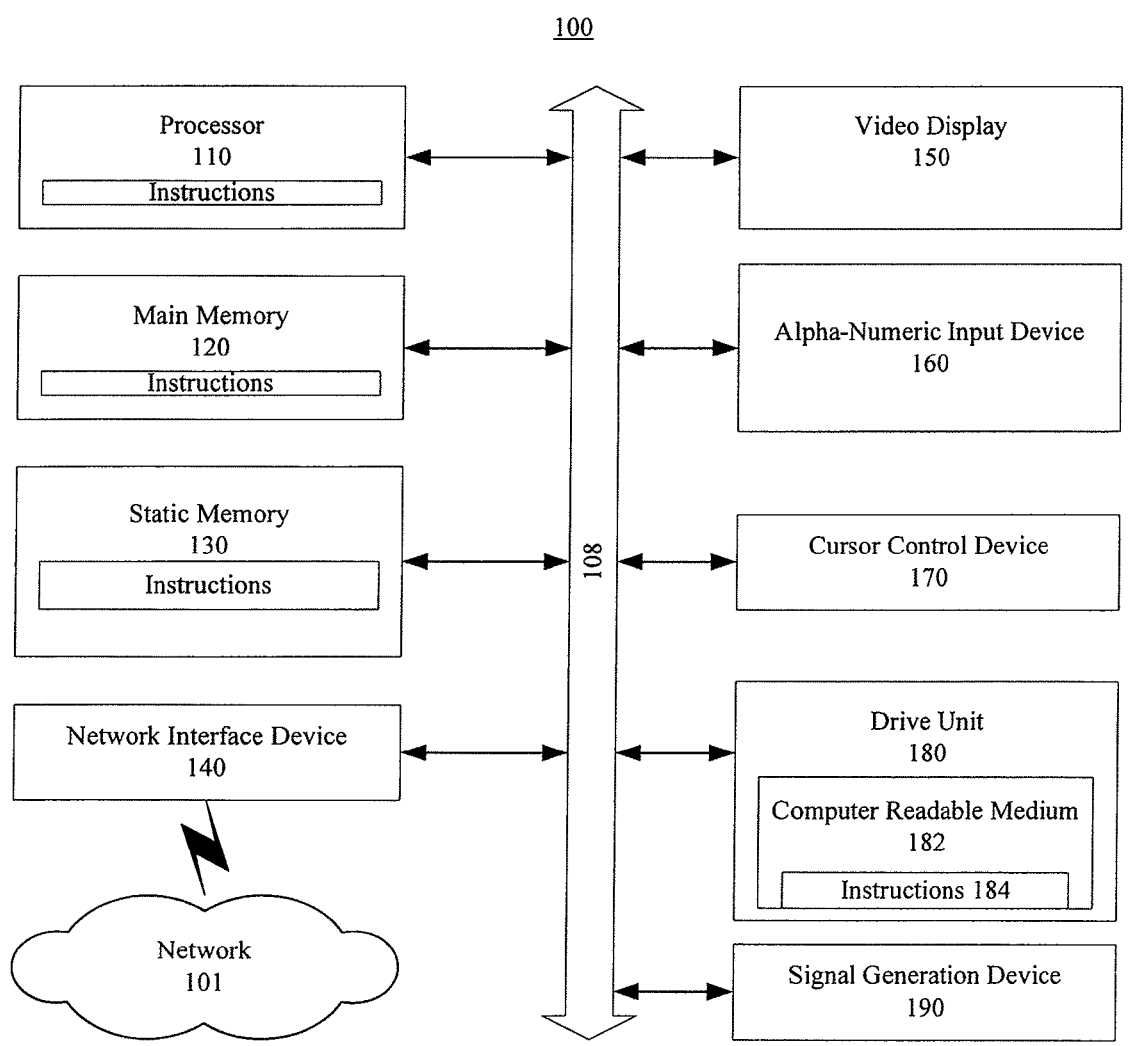
FIG. 1 shows an exemplary general computer system that includes a set of instructions for telepresence simulation with multiple interconnected devices described herein.

FIG. 1 is an illustrative embodiment of a general computer system that includes a set of instructions for performing processes for telepresence simulation with multiple interconnected devices as described herein. The general computer system is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices. For example, the computer system 100 may include or be included within any one or more of the computers, servers, bridges, devices, systems, or communication networks described herein.

In a networked deployment, the computer system may operate in the capacity of a server or as a client user computer in a server-client user network environment, or as a peer computer system in a peer-to-peer (or distributed) network environment. The computer system 100, or portions thereof, can also be implemented as or incorporated into various devices, such as a conference bridge, a computer, a control server, a personal computer (PC), a tablet PC, a set-top box (STB), a personal digital assistant (PDA), a mobile device, a palmtop computer, a laptop computer, a desktop computer, a communication device, a wireless telephone, a personal trusted device, a web appliance, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an alpha-numeric input device 160, such as a keyboard, another input device (not shown), such as a remote control device having a wireless keypad, a keyboard, a microphone coupled to a speech recognition engine, a camera such as a video camera or still camera, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

In accordance with various embodiments of the present disclosure, the methods described herein may be implemented by software programs executable by a computer system. Further, in an exemplary, non-limited embodiment, implementations can include distributed processing, component/object distributed processing, and parallel processing.

Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

The present application describes mechanisms to coordinate multiple devices to form an individual telepresence point. The devices may each be owned, operated and under the exclusive control of different individuals in an introductory example, such as when the individuals and devices are together in a common space such as a room or sports arena. The devices may have different multimedia capabilities, such as an ability to capture audio or video or an ability to transmit over cellular networks or networks meeting different IEEE 802.16 standards such as WiMAX. The presence of the devices in the common space or in a common network is determined, and this presence is reflective of an ability to coordinate the multimedia capabilities of the different devices together to form a telepresence point. The use of the devices can be coordinated so as to make best use of the capabilities of the different devices. Capabilities of different devices can be selectively and temporarily enabled for use. The multimedia capabilities of different devices can be coordinated remotely by a control computer such as a server, or locally using one or more than one of the devices to control and coordinate the different devices.

Figure 2:
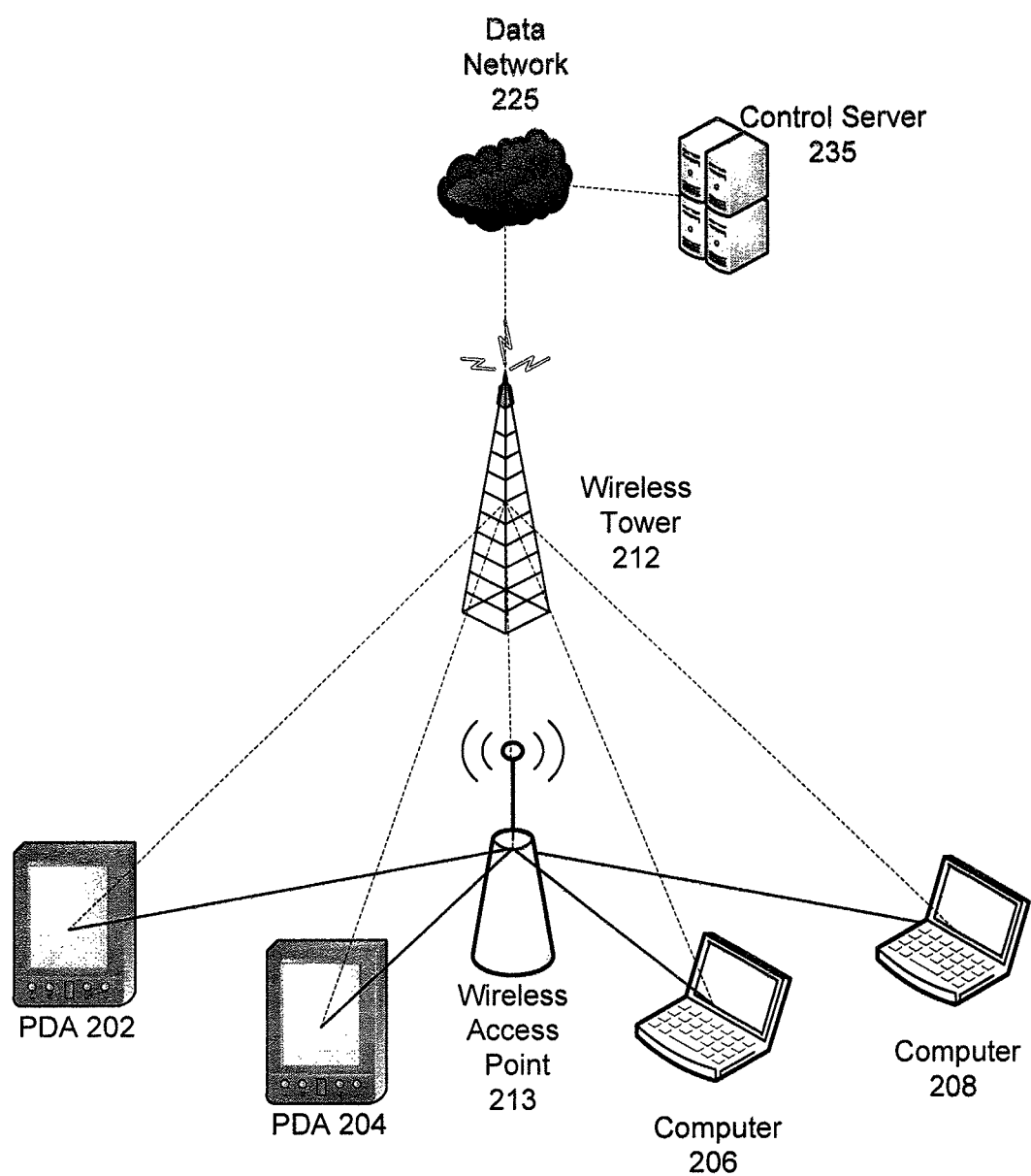
FIG. 2 shows an exemplary network for telepresence simulation with multiple interconnected devices described herein, according to an aspect of the present disclosure.

FIG. 2 shows an exemplary network for telepresence simulation with multiple interconnected devices. In FIG. 2, PDA 202, PDA 204, computer 206 and computer 208 are each devices in a network provided by wireless access point 213, and also in a second data network 225. The network provided by wireless access point 213 may be considered a local network, such as a wireless fidelity (Wi-Fi) network. The data network 225 may include multiple networks, including wireless and wire line networks that carry data to and from a control server 235. In the embodiment of FIG. 2, the devices 202-208 are coordinated so as to form a single telepresence point.

In the embodiment of FIG. 2, the devices 202-208 may be aware of each other in the network provided by wireless access point 213 by blindly sending signals to either advise of their own presence or to request information of the presence of the other devices 202-208. In the embodiment of FIG. 2, the devices 202-208 may also be made aware of each other in the data network 225 by the control server 235 that is aware of the presence of each device. Alternatively, in an embodiment where the control server 235 is aware of each device 202-208, the devices 202-208 may be controlled individually by the control server 235 without the devices 202-208 being aware of one another. In yet another embodiment such as the embodiment shown in FIG. 6 and described below, the devices 202-208 may coordinate with one another where one or more of the devices 202-208 act as the telepresence point controller and send instructions to other devices 202-208 or where the devices 202-208 mutually negotiate with one another to form a single telepresence point.

In the embodiment of FIG. 2, the control server 235 determines the presence of the devices 202-208 in the same space and in the local network provided by wireless access point 213. However, this determination may also be made independently by one or more of the devices 202-208, or in place of the control server 235 by one or more of the devices 202-208.

In the embodiment of FIG. 2, the control server 235 also determines the multimedia capabilities of the devices 202-208. This determination may also be made independently by one or more of the devices 202-208, or in place of the control server 235 by one or more of the devices 202-208. The determination of multimedia capabilities includes determining whether a device is capable of capturing audio input, storing audio input, transmitting audio input, capturing image or video input, storing image or video input, transmitting image or video input, and any other multimedia capabilities of any of the devices 202-208.

A single telepresence point can be formed by the devices 202-208 by coordinating the multimedia capabilities of the devices 202-208. For example, in the embodiment of FIG. 2, the control server 235 may selectively instruct PDA 202 to capture and transmit audio input, and computer 206 to capture and transmit video input using a video camera component such as a web camera. PDA 202 and/or computer 206 may also be coordinated to form a single telepresence point when instructed by displaying video and playing back audio. The control server 235 thereby either refrains from instructing others of the devices 202-208 to use these types of multimedia capabilities, or affirmatively instructs the others of the devices 202-208 not to use these types of multimedia capabilities.

In an embodiment, multiple devices with similar multimedia capabilities may be instructed to use the same capability simultaneously in forming a telepresence point. For example, devices with camera capabilities may be instructed to capture images at the same time, and the images may be used to form a stereo image view. Similarly, multiple devices with audio capture capabilities may be instructed to simultaneously capture and transmit audio, so as to form present a combined audio output from multiple sources in an environment such as a concert.

The control server 235 may also instruct different devices 202-208 to use a multimedia capability at different times. For example, the control server 235 may instruct computer 206 to transmit video of a speaker in the room who is currently speaking due to a vantage point of the computer 206. When another of the devices 202-208 has a better vantage point due to the speaker moving position or another speaker beginning to speak, the control server 235 may determine that the other of the devices 202-208 has the better vantage point, and instruct the other of the devices 202-208 to transmit the video of the speaker speaking while instructing computer 206 to stop transmitting video. The control server 235 may thus enable different combinations of the devices 202-208 to communicate using different multimedia capabilities at different times. The control server 235 may enable the different communications by instructing the devices when to capture and/or transmit a particular form of multimedia data, and when to stop.

The multimedia data is transmitted by the devices 202-208 through the data network 225 via the wireless tower 212, and can be coordinated by the control server 235 to simulate the presence of all devices 202-208 as a single telepresence point. In an embodiment, the different multimedia capabilities of the different devices 202-208 are enabled/not enabled or activated/deactivated without a specific instruction of the users of the different devices 202-208 other than a general authorization by the users to use the different devices in the manner requested by the control server 235. The general authorization may be provided for a given period of time, or for coordination with a particular set of other devices or other users, or may be a true general authorization to use multimedia capabilities whenever requested until the general authorization is revoked.

In an embodiment, the users of the different devices 202-208 may receive requests from a coordinating computer as to where a device should be placed or how a device should be oriented, so that the capabilities of the device are put to the best use possible. For example, a user of a smart phone or tablet computer with a camera capability may receive an instruction via text or a pop-up screen to direct the camera of the smart phone or tablet computer on a particular object such as a particular speaker or on a podium.

In the embodiment of FIG. 2, the devices 202-208 are merely representative of devices that can accept instructions to capture and transmit, and/or receive and display multimedia information as part of a coordinated set of devices that form a single telepresence point. Devices in the embodiment of FIG. 2 or in other networks described herein may also include cameras, smart phones, desktop computers, or other types of devices that can provide or receive coordination instructions and/or input or output some form of multimedia information.

The various devices 202-208 may also be dual use devices that communicate via a telephony network (not shown), the network formed by wireless access point 213, and data network 225. However, in other embodiments, the devices 202-208 shown in FIG. 2 may also communicate using a single network such as the internet or a cellular network, or a combination of appropriate networks. Users of devices 202-208 may also individually use more than one communications device, such as a telephone set to listen to or participate in an audio conference via a telephony network and a personal digital assistant to provide or obtain multimedia content via the internet or another data network. Multiple individuals may also share a single communications device 202-208 to, for example, listen to or participate in an audio conference or provide or obtain multimedia content.

The various speaker's communication devices 202-208 may also take part in a telephone conference via a conference bridge (not shown), or an internet multimedia conference via a web server. The control server 235 may monitor such a conference bridge or web server to determine which devices 202-208 and which multimedia capabilities of the devices 202-208 to use based on which speakers are speaking, or other criteria as described herein.

Figure 3:
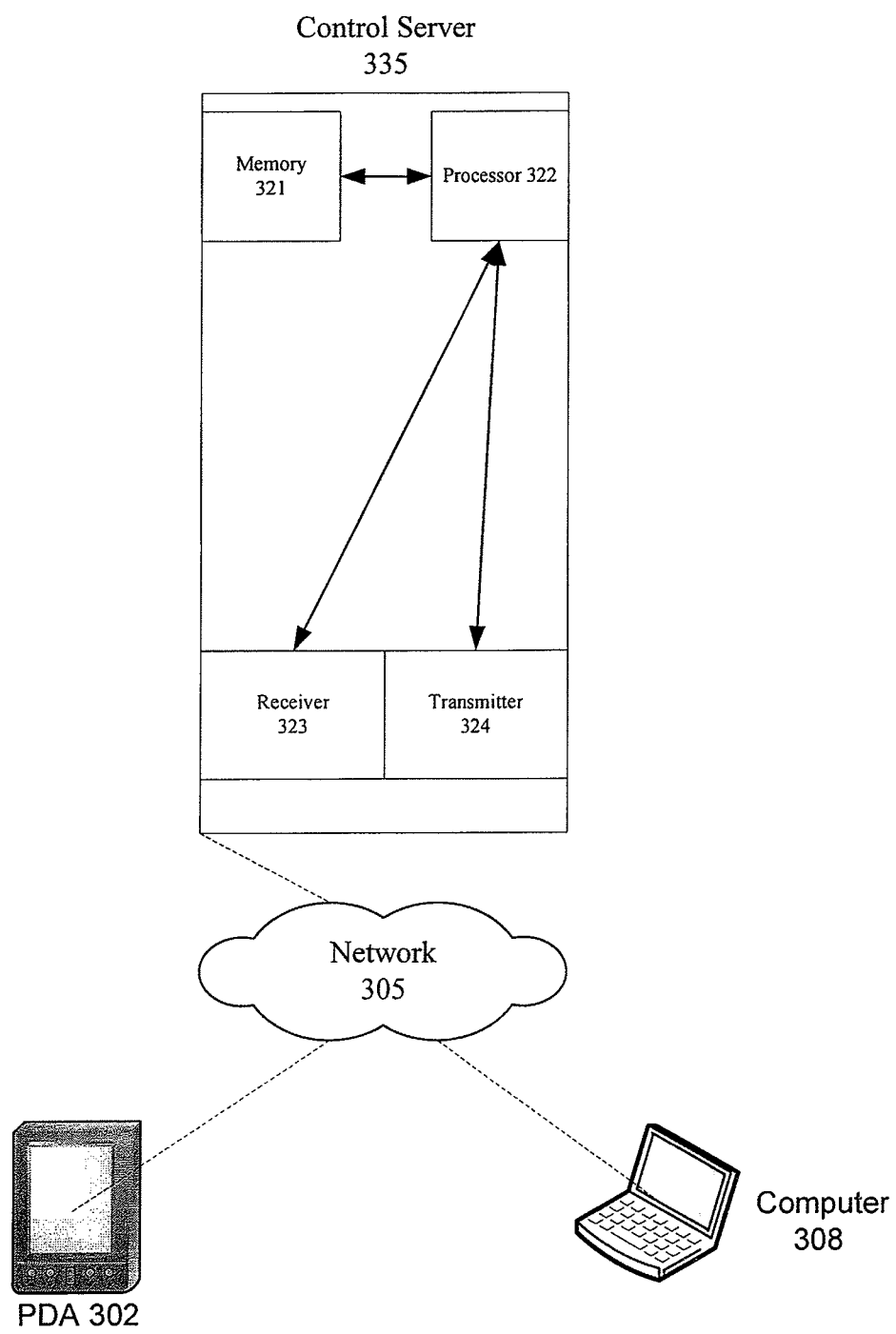
FIG. 3 shows another exemplary network for telepresence simulation with multiple interconnected devices network, according to an aspect of the present disclosure.

FIG. 3 shows another exemplary network for telepresence simulation with multiple interconnected devices network. In the embodiment of FIG. 3, a control server 335 communicates across network 305 with PDA 302 and computer 308. The control server 335 is shown to include a memory 321, processor 322, receiver 323 and transmitter 324. The receiver 323 and transmitter 324 communicate over network 305. The processor 322 processes instructions and data from the receiver 323 and memory 321, and forwards instructions or data to transmitter 324 for transmission or to memory 321 for storage. In FIG. 3, control server 335 includes a memory 321, a processor 322, a receiver 323 and a transmitter 324. The receiver 323 and transmitter 324 communicate over network 310. The processor 322 processes instructions and data from the receiver 323 and memory 321, and forwards instructions or data to transmitter 324 for transmission or to memory 321 for storage.

As an example of an application for telepresence simulation with multiple interconnected devices, the control server 335 may be employed or engaged by an organization with employees at different worksites. When groups of such employees at different worksites wish to conduct a conference between the different worksites, the employees can activate applications that reside on their devices, and thereby register the devices with control server 335 as "available" for the conference. The control server 335 can then coordinate the devices so as to selectively enable or activate or control or otherwise instruct the devices when to use specified multimedia capabilities for the conference. In this manner, employees at a site can communicate in a conference via different devices that are coordinated as one telepresence point. Different employees at different sites can communicate in this manner by forming telepresence points for each site. This scenario also applies to business service providers, contractor, clients/customers, professional organizations, or other groups of people with devices that can be coordinated.

The devices 202-208 may download software applications in order to participate in coordinated telepresence points. For example, a tablet computer or smart phone may download an application from an online application store, and the application may passively track the device for availability to form a telepresence point. The application may track when other devices are nearby. Alternatively, the application may send signals to another local device or a remote server that is coordinating devices to form a telepresence point. Additionally, the application may be on unless and until a user turns the application off, or may only be turned on at the request of a user, or upon receipt of a request from another device or server that is coordinating devices to form a telepresence point.

The ability to participate in formation of a single telepresence point from different devices 202-208 can be determined by the presence of the devices 202-208 in a local network, or even by one of the different devices communicating via wire or wirelessly directly with another of the devices 202-208. However, this ability can also be determined in other ways that use information reflective of the proximity of different devices 202-208 together. For example, proximity of devices 202-208 together can also be determined using global positioning satellite (GPS) coordinates retrieved from GPS-enabled devices, network addresses for devices 202-208 with network addresses associated with a fixed location, registration signals received from the devices 202-208 at a common signal waypoint such as a wireless access point or cell tower, or by the devices finding each other using a protocol such as Bluetooth. The proximity of the devices 202-208 in the same space or area or in the same network may be determined by one or more of the devices 202-208, or by a remote control server 335 or other apparatus remote from the devices.

Devices 202-208 may also include one or more sensory and/or output devices that communicate only with other local devices via wire or wirelessly. For example, a sensory and/or output device may include a microphone, a speaker, a motion sensor, a video sensor, or a sensor with another type of sensory capability. The sensory and/or output device may then communicate directly with one or more other devices 202-208 via wire or wirelessly without requiring an address in a wide area network. The sensory and/or output capabilities of such a device can be used to form a single enhanced telepresence with the other devices 202-208.

As described above, in an embodiment, one or more of the devices 202-208 may be incapable of long-range communications, and may only be capable of short-range communications such as Bluetooth communications or communications limited to Wi-Fi networks or even a direct wire connection. Similarly, different devices 202-208 may have different communications capabilities, and may have main purposes other than communications. An example of such a device with a main purpose other than communications is a networked security camera at a known fixed location, where the camera may be selectively activated or used on demand when able to provide the best view of a scene. Other devices may even be activated to communicate only upon demand of a coordinator that requests a device to activate a multimedia capability in order to initially determine the value of the device's multimedia capability relative to the same multimedia capability of other nearby devices.

In other examples, different devices may use different data service providers. In such circumstances, a proxy server may exchange data and/or commands among different networks.

An example of security cameras used to form a telepresence point is where multiple security cameras are concentrated for different entities and purposes in the same area, such as in a downtown business area. The security cameras may be connected to different private security networks, but made available to a public emergency communications center for use when necessary. Such security cameras may be dynamically coordinated as needed, or may be pre-registered by the emergency communications center as being in a common space and therefore available for coordination as a single telepresence point as needed.

A coordinator may also coordinate multiple telepresence points that each include multiple devices. For example, a city may wish to coordinate thousands of independently owned security cameras, so as to activate the cameras in groups to form telepresence points in certain circumstances. In this example, groups of independently owned networked cameras may be activated and coordinated remotely in order to form a single telepresence point for each group. A different example where multiple telepresence points can each be formed of different groups of devices is a sporting event, or an awards event, where different audience members with different devices may be coordinated into groups. In the latter example, multimedia capabilities of devices in each group can be selectively enabled in order to coordinate the "best" available sources of multimedia information from the different devices in each group.

Figure 4:
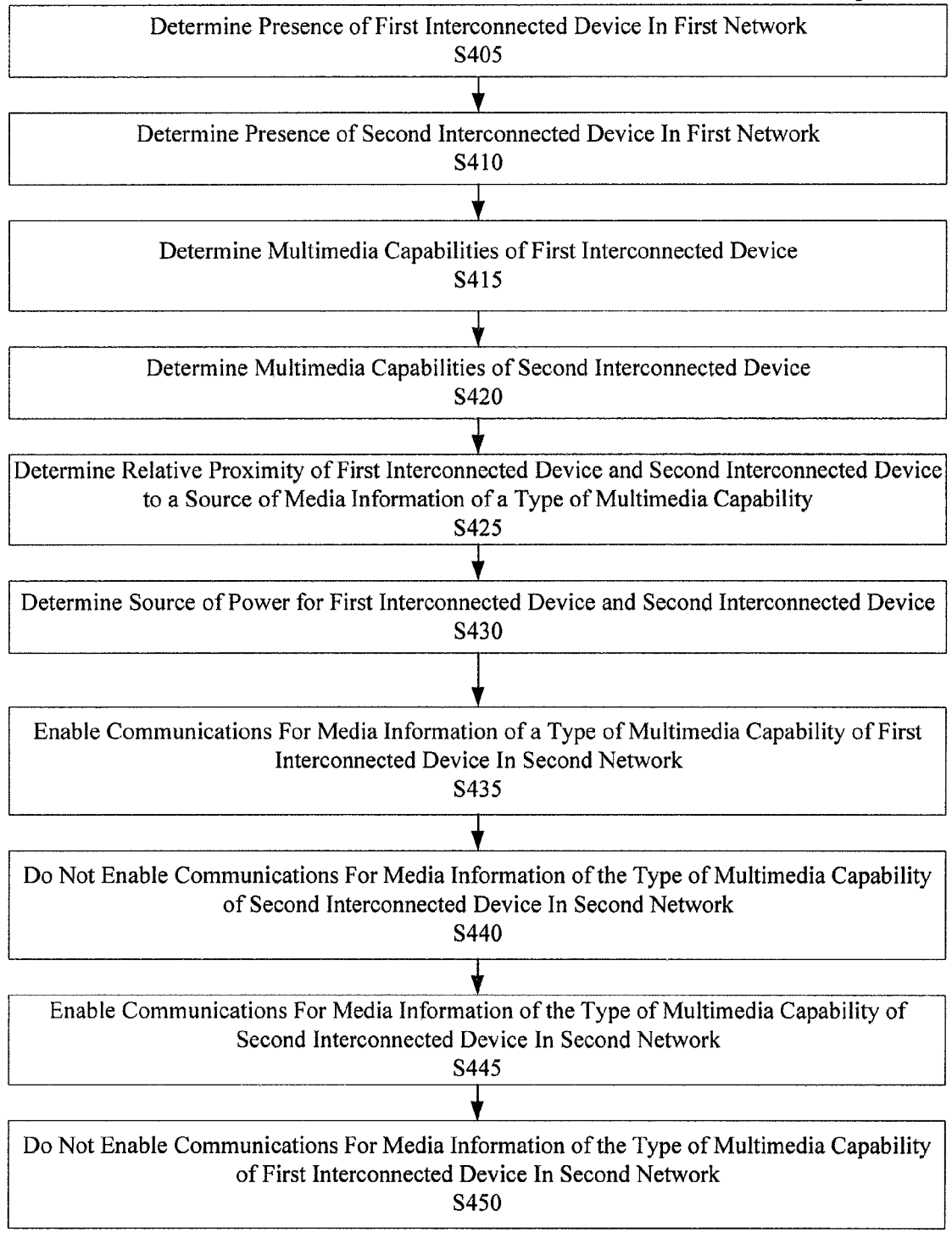
FIG. 4 shows an exemplary process for telepresence simulation with multiple interconnected devices described herein, according to an aspect of the present disclosure.

FIG. 4 shows an exemplary process for telepresence simulation with multiple interconnected devices described herein. In FIG. 4, the presence of a first interconnected device in a first network is determined at S405. The presence of a second interconnected device in the first network is determined at S410. As described herein, the presence of these devices in the same network may be determined by a communication waypoint in the network such as wireless access point 213, by an apparatus remote from the devices such as remote control server 335, or by one or more of the devices 202-208.

At S415, multimedia capabilities of the first interconnected device are determined. At S420, multimedia capabilities of the second interconnected device are determined. The multimedia capabilities may be determined from device profiles stored on the first interconnected device or second interconnected device, or using device identifications that identify the make and model of the device. Profiles may also be manually configured, such as when a user of a PDA knows the PDA's camera does not work and manually adjusts the PDA profile to remove the camera capability from consideration in coordinating telepresence points. The multimedia capabilities may also be determined from pre-determined capability information for devices registered in advance for telepresence coordination. Multimedia capabilities may also be dynamically provided by the first and second devices in response to requests.

At S425, a determination is made as to the relative proximity of the first interconnected device and second interconnected device to a source of media information of a type of multimedia capability. For example, if a speaker is speaking in the presence of the first interconnected device and the second interconnected device, the devices may be instructed to attempt to capture audio of the speaker in order to determine which of the devices receives a higher audio volume from the speaker. As another example where a speaker is the source of media information, the devices may be instructed to attempt to capture images or video of the speaker in order to determine which of the devices has the best, if any, view of the speaker.

At S430, a determination is made as to the source of power of the first interconnected device and second interconnected device. In this regard, the determination may include whether the first interconnected device and the second interconnected device are powered by battery or by a fixed and steady supply of power such as a wire or cable from an electrical outlet. The determination at S430 may result in selection of the device with the more reliable source of power, or the device with a source of power expected to last the longest time.

At S435, communications of the first interconnected device are enabled in a second network for media information of a type of multimedia capability. For example, the first interconnected device may be instructed to capture and transmit audio, or still or video images, of a source of media information such as a speaker. The first interconnected device is enabled to communicate the media information based on determinations such as those made in S425 or S430, or other determinations of which device is best suited to communicate the media information of a specified type. At S440, communications of the second interconnected device are not enabled in the second network for media information of the type of multimedia capability. For example, the second interconnected device may be instructed not to capture and transmit media information of the specified type, or the second interconnected device may be affirmatively not instructed to capture and transmit media information of the specified type.

At S445, communications of the second interconnected device are enabled in the second network for media information of the type of multimedia capability. For example, the second interconnected device may be instructed to capture and transmit audio, or still or video images, of a source of media information such as a speaker. The second interconnected device is enabled to communicate the media information based on determinations such as those made in S425 or S430, or other determinations of which device is best suited to communicate the media information of a specified type. At S450, communications of the first interconnected device are not enabled in the second network for media information of the type of multimedia capability. For example, the first interconnected device may be instructed not to capture and transmit media information of the specified type, or may be instructed to stop capturing and transmitting media information in a countermand of a previous instruction provided at S435.

The switch between enabling communications at S435 and S445 may be due to a change in speakers, or a change in location of speaker. The switch may also be made due to power running out on one of the first interconnected device and second interconnected device, or one of the first interconnected device and second interconnected device being moved or turned off. Regardless of the reasons for switching the devices used for a particular multimedia capability, the determination and coordination including any instructions to switch may be performed automatically by a coordinator without human intervention.

As another example of how telepresence simulation may be performed, emergency responders responding to an emergency scene could set up different devices at different locations in order to capture audio or video of the scene. The devices may each actively monitor the scene, and selectively and temporarily take turns transmitting information such as the audio or video until a determination is made as to which device is best suited to capture audio or video desired by commanders located remotely from the scene. The devices may even be devices automatically provided as equipment in vehicles, such as squad car or fire engine cameras mounted above dashboards.

Figure 5:
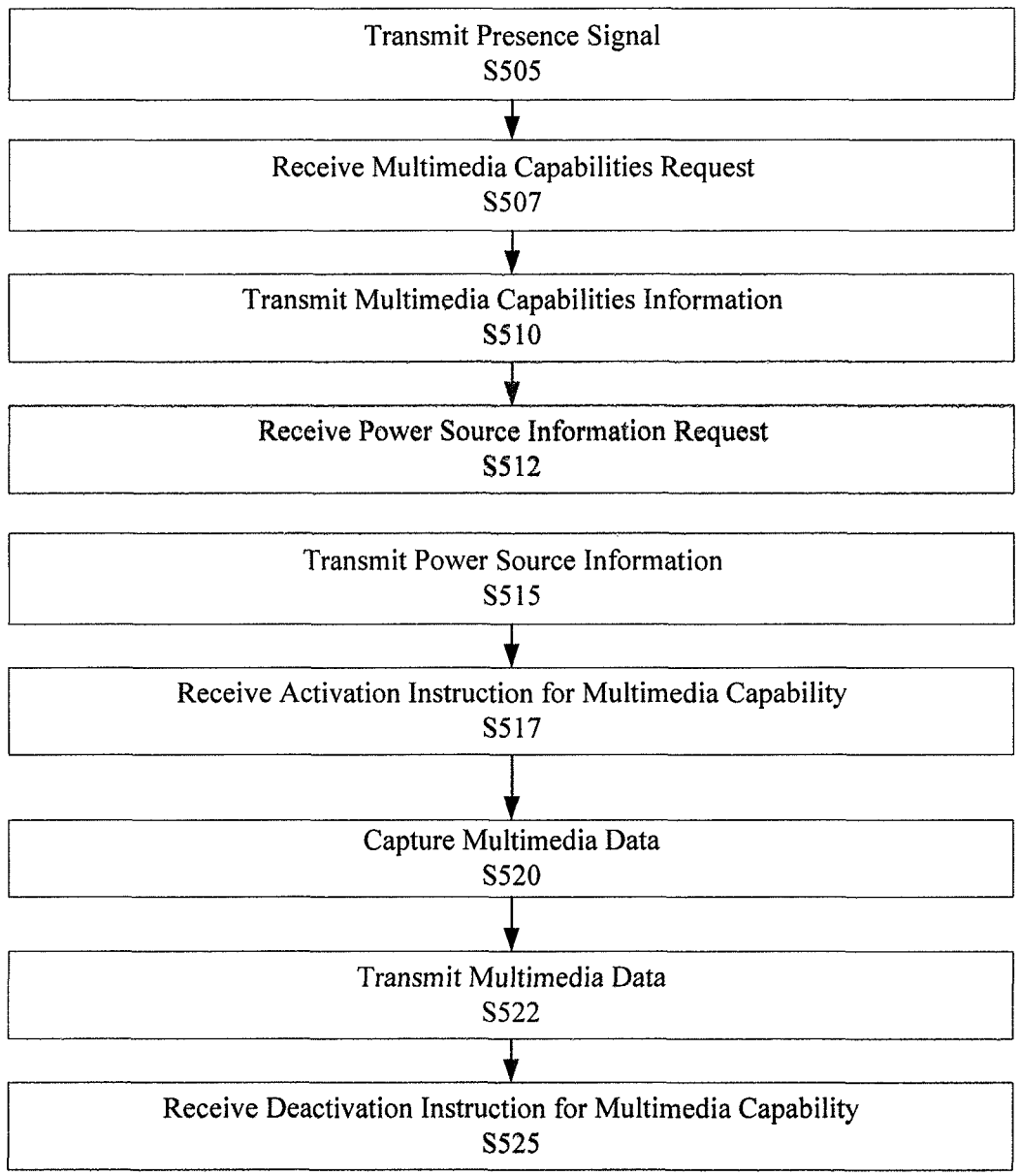
FIG. 5 shows another exemplary process for telepresence simulation with multiple interconnected devices, according to an aspect of the present disclosure.

FIG. 5 shows another exemplary process for telepresence simulation with multiple interconnected devices. In FIG. 5, presence signals are transmitted at S505. These signals may be signals transmitted from devices that will be used in a telepresence simulation, so that the devices can detect one another and coordinate the telepresence simulation amongst one another. Alternatively, these signals may be signals transmitted from devices that will be used in a telepresence simulation so that a remote control server can coordinate the devices even if the devices are not necessarily aware of each other.

In FIG. 5, a request for multimedia capabilities is received at S507. This may be a request from control server 235, or from another device that will coordinate the telepresence simulation. At S510, the device that receives the request at S507 responds by transmitting information of its multimedia capabilities.

At S512, a request for power source information is received. This may be a request from control server 235, or from another device that will coordinate the telepresence simulation. At S515, the device that receives the request at S512 responds by transmitting information of its power source, such as the type of the source, or the expected duration of the source.

At S517, an activation instruction is received for a multimedia capability. This may be an instruction to capture and transmit audio or still or video images, or may be an instruction to simply transmit audio or still or video images in the event that the device will capture such multimedia information until instructed by a user to stop. At S520, the device captures the multimedia data and at S522 the device transmits the multimedia data. At S525, the device receives a deactivation instruction for the multimedia capability, and subsequently the device will cease transmitting the multimedia data.

In the embodiment of FIG. 5, a device provides presence and capability information, and then is used in the coordination of a telepresence point. The device that performs the method of FIG. 5 would be coordinated with other devices that perform the same or similar methods, including one or more devices that may actually coordinate the multiple devices as a single telepresence point.

Figure 6:
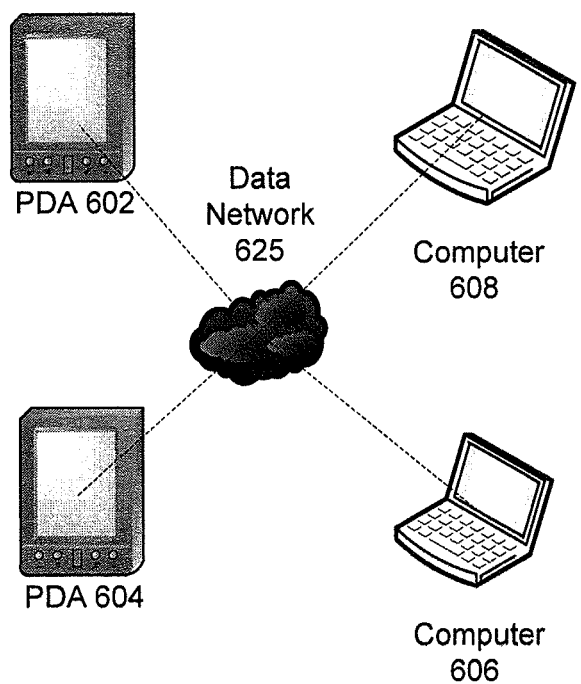
FIG. 6 shows another exemplary network for telepresence simulation with multiple interconnected devices, according to an aspect of the present disclosure.

FIG. 6 shows another exemplary network for telepresence simulation with multiple interconnected devices. In FIG. 6, PDAs 602 and 604 and computers 606 and 608 are connected over a single data network 625. In this embodiment, the devices 602-608 may coordinate amongst themselves to form a single telepresence point. The devices 602-608 either negotiate amongst themselves to determine which device will capture and transmit different forms of multimedia information, or a single device solicits and receives profile information and determines when As described above, multiple devices can be coordinated in order to provide multimedia data as a single telepresence point. The devices can be coordinated remotely from afar or locally, and the coordinator may be an external device or one of the devices used to form the single telepresence point. One or more sensory and/or output devices without a communications capability or address in a wide area network may even be coordinated as an adjunct to one of the other devices with such a capability or address. The telepresence point can be formed of devices in a common space as small as a single room, or as large as or larger than a sports arena. The uses of such coordinated telepresence points include conferences, emergency scenes, sporting events, group calls, and other instances where communications can be improved by selectively using the best suited of different devices to communicate particular forms of multimedia data.

The coordination described herein can occur without specific real-time input from a user of a device, such as when a user pre-authorizes use of the device to form a coordinated telepresence point. As an example, emergency responders may set up personal communications devices at a crime scene, and a remote operator may select among the best audio or video streams to coordinate the devices as a single telepresence point. Similarly, a remote or local server, or one of the devices, may automatically coordinate which multimedia capabilities of which devices to use based on which is best suited to provide certain kinds of information.

In the embodiments where devices coordinate amongst themselves to form a single telepresence point, the devices may communicate using peer-to-peer-protocol to automatically negotiate the configuration of a coordinated telepresence point. Additionally, devices may register their availability to contribute to a coordinated telepresence point as they enter a space or network, and unregister their availability as they leave a space or network.

The above description also includes determining the presence of devices in a common space or network. However, devices may be selected for coordination into a single telepresence point based on users inviting one another to join a telepresence point, such as a coordinator selecting a set of known nearby users or devices from a list displayed on a device. The other devices may then be automatically joined in the coordination efforts, or the users of the other devices may be asked to authorize their devices for coordination. Devices may also be discovered to be in proximity based on similarities and overlaps in audio streams or overlapping images that are captured by the different devices. A coordination server may monitor the multimedia data captured by each device to determine which devices are capturing similar content such that the devices can be formed to a single telepresence point.

Although the above description mainly describes embodiments where devices are coordinated to selectively capture and transmit multimedia information, the devices may also be coordinated to form a single telepresence point by selectively or jointly outputting information such as a video display. In this manner, multiple devices with video display capability may be placed together such that a single telepresence point is formed and a single integrated display is output across the multiple different video displays of the different devices. Output capabilities that can be coordinated include playing back 3D audio by multiple devices, showing different views of speakers/scenes by multiple displays, and providing a relatively large screen for an active speaker and relatively smaller screens for other participants. Devices may also be controlled to do a mixture of tasks, such as capturing and transmitting information and/or receiving and outputting information.

Similarly, while the above description mainly describes embodiments where the devices are controlled without requiring activity from users and owners, the devices may also be used in a manner where users and owners affirmatively assist in forming a single telepresence point with multiple different devices. For example, multiple owners of different smart phones in a conference room may be asked to place their smart phones on a conference table with cameras pointing towards a lecturer. In this way, a single telepresence point may be formed among the cameras, where video and audio of the lecturer is captured and transmitted from selected smart phones at the conference table. In an embodiment, an apparatus may be provided to seat multiple devices described herein, in order to obtain the maximum coverage of different portions of the common space in which the multiple devices are present.

In another embodiment, information of a known space may be pre-registered, such as the best locations for devices to attain a particular viewpoint of a podium or stage or the best location to capture acoustics from an orchestra pit. These optimization parameters may be stored in association with information of a particular space or location, and used later in coordinating different devices to form a single telepresence point.

In an embodiment, the devices may be controlled to adjust vantage points by, for example, vibrating or otherwise being manipulated, so as to change a vantage point to better capture audio, images or video. In other embodiments, devices that are already configured to adjust position or vantage points, such as security cameras, may be manipulated in the coordination of different devices to form a single telepresence point.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

As described above, telepresence is coordinated among multiple interconnected devices according to an aspect of the present disclosure. The presence of a first interconnected device and a second interconnected device in a first network and in a common space is determined. Multimedia capabilities of the first interconnected device and the second interconnected device are determined. Communications of at least one type of media information using one of the first interconnected device and the second interconnected device are selectively and temporarily enabled by an external controller over a second network. Communications of the at least one type of media information using the other of the first interconnected device and the second interconnected device are selectively and temporarily not enabled by the external controller over the second network.

According to another aspect of the present disclosure, the method includes selectively and temporarily enabling communications of the at least one type of media information using the other of the first interconnected device and the second interconnected device over the second network and simultaneously and temporarily not enabling transmission of the at least one type of media information using the one of the first interconnected device and the second interconnected device.

According to still another aspect of the present disclosure, the communications include transmitting. The at least one type of media information is selectively and temporarily transmitted from the first interconnected device and the second interconnected device in common to a remote recipient.

According to yet another aspect of the present disclosure, the communications include displaying, and the at least one type of media information is selectively and temporarily displayed by the first interconnected device and the second interconnected device.

According to another aspect of the present disclosure, the communications include audibly outputting the at least one type of media information by the first interconnected device and the second interconnected device.

According to yet another aspect of the present disclosure, the communications include transmitting images captured by the first interconnected device and the second interconnected device.

According to yet another aspect of the present disclosure, the method also includes selectively and temporarily enabling communications of at least one type of media information using the one of the first interconnected device and the second interconnected device and the other of the first interconnected device and the second interconnected device over the second network simultaneously and temporarily.

According to another aspect of the present disclosure, the first interconnected device and the second interconnected device are selected to transmit the at least one type of media information based on relative proximity of the first interconnected device and the second interconnected device to a source of the at least one type of media information.

According to still another aspect of the present disclosure, the first interconnected device and the second interconnected device are coordinated as a first telepresence point over the second network, a third interconnected device and a fourth interconnected device are coordinated as a second telepresence point over the second network, and the first telepresence point and the second telepresence point are coordinated by the same external controller.

According to yet another aspect of the present disclosure, the first interconnected device and the second interconnected device are selected to transmit the at least one type of media information based on a determination that the selected first interconnected device or second interconnected device is connected to a constant external source of power.

According to another aspect of the present disclosure, the first interconnected device and second interconnected device are selected to transmit the at least one type of media information based on a determination of which of the first interconnected device and second interconnected device has a power supply estimated to last a longest time.

According to still another aspect of the present disclosure, the multimedia capabilities include a video capture capability.

According to yet another aspect of the present disclosure, the method also includes registering the first interconnected device and second interconnected device as being in the same presence at an external remote presence coordinator.

According to another aspect of the present disclosure, the presence of the first interconnected device and second interconnected device in the same space is determined by the external controller based on information received from the first interconnected device and second interconnected device.

According to still another aspect of the present disclosure, the first interconnected device is automatically coordinated with the second interconnected device without a designation from a user of the first interconnected device.

According to yet another aspect of the present disclosure, the second interconnected device receives a broadcast of presence over the first network from the first interconnected device and determines the presence of the first interconnected device and second interconnected device in the first network based upon receipt of the broadcast.

According to an aspect of the present disclosure, an apparatus coordinates telepresence among multiple interconnected devices. A tangible non-transitory memory stores information indicating multimedia capabilities of a first interconnected device and a second interconnected device in a first network and in a common space. A signal receiver receives signals indicating the presence of the first interconnected device and the second interconnected device in the first network. A tangible processor determines, based upon receipt of the signals, multimedia capabilities of the first interconnected device and the second interconnected device from the information stored in the memory. A transmitter transmits signals selectively and temporarily enabling communications of at least one type of media information using one of the first interconnected device and the second interconnected device over a second network, and simultaneously and temporarily not enabling communications of the at least one type of media information using the other of the first interconnected device and the second interconnected device over the second network.

According to another aspect of the present disclosure, the apparatus is external to the first interconnected device and the second interconnected device, and communicates with the first interconnected device and the second interconnected device over the second network.

According to an aspect of the present disclosure, telepresence among multiple interconnected devices is coordinated by a method. The presence of a first interconnected device and a second interconnected device is determined. Multimedia capabilities of the first interconnected device and the second interconnected device are determined. The multimedia capabilities of the first interconnected device and the second interconnected device are coordinated among the first interconnected device and the second interconnected device, by selectively and temporarily enabling communications of at least one type of media information using the second interconnected device, and simultaneously and temporarily not enabling communications of the at least one type of media information using the first interconnected device.

According to another aspect of the present disclosure, the first interconnected device and the second interconnected device communicate with one another and coordinate multimedia capabilities within a local network.

While a computer-readable medium herein may be shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for coordinating telepresence among multiple interconnected devices, comprising:

determining the temporary presence of a first interconnected mobile device and a second interconnected mobile device in a first network and in a common definable space;

determining multimedia capabilities, including the ability to capture any data of a particular type of media, of the first interconnected mobile device and the second interconnected mobile device; and selectively and temporarily enabling communications of a type of media information using one of the first interconnected mobile device and the second interconnected mobile device by an external controller, external to the first interconnected mobile device and the second interconnected mobile device, over a second network and simultaneously and temporarily not enabling communications of the type of media information using the other of the first interconnected mobile device and the second interconnected mobile device by the external controller over the second network, wherein the first interconnected mobile device and the second interconnected mobile device are temporarily and dynamically coordinated on-demand by the external controller during the temporary presence in the common definable space, and wherein the first interconnected mobile device and second interconnected mobile device are selected to transmit the type of media information based on a determination of which of the first interconnected mobile device and second interconnected mobile device has a power supply estimated to last a longest time.

2. The method of claim 1, further comprising:
selectively and temporarily enabling communications of the type of media information using the other of the first interconnected mobile device and the second interconnected mobile device over the second network and simultaneously and temporarily not enabling transmission of the type of media information using the one of the first interconnected mobile device and the second interconnected mobile device.

3. The method of claim 2,
wherein the type of media information is selectively and temporarily transmitted from the first interconnected mobile device and the second interconnected mobile device in common to a remote recipient.

4. The method of claim 2,
wherein the communications include displaying, and
wherein the type of media information is selectively and temporarily displayed by the first interconnected mobile device and the second interconnected mobile device.

5. The method of claim 2,
wherein the communications include audibly outputting the type of media information by the first interconnected mobile device and the second interconnected mobile device.

6. The method of claim 2,
wherein the communications include transmitting images captured by the first interconnected mobile device and the second interconnected mobile device.

7. The method of claim 1, further comprising:
selectively and temporarily enabling communications of a type of media information using the one of the first interconnected mobile device and the second interconnected mobile device and the other of the first interconnected mobile device and the second interconnected mobile device over the second network simultaneously and temporarily.

8. The method of claim 1,
wherein the first interconnected mobile device and the second interconnected mobile device are selected to transmit the type of media information based on relative proximity of the first interconnected mobile device and the second interconnected mobile device to a source of the type of media information.

9. The method of claim 1,
wherein the first interconnected mobile device and the second interconnected mobile device are coordinated as a first telepresence point over the second network, a third interconnected device and a fourth interconnected device are coordinated as a second telepresence point over the second network, and the first telepresence point and the second telepresence point are coordinated by the same external controller.

10. The method of claim 1,
wherein the first interconnected mobile device and the second interconnected mobile device are selected to transmit the type of media information based on a determination that the selected first interconnected mobile device or second interconnected mobile device is connected to a constant external source of power.

11. The method of claim 1,
wherein the multimedia capabilities include a video capture capability.

12. The method of claim 1, further comprising:
registering the first interconnected mobile device and second interconnected mobile device as being in the same presence at an external remote presence coordinator.

13. The method of claim 1,
wherein the presence of the first interconnected mobile device and second interconnected mobile device in the common definable space is determined by the external controller based on information received from the first interconnected mobile device and second interconnected mobile device.

14. The method of claim 1,
wherein the first interconnected mobile device is automatically coordinated with the second interconnected mobile device without a designation from a user of the first interconnected mobile device.

15. The method of claim 1,
wherein the second interconnected mobile device receives a broadcast of presence over the first network from the first interconnected mobile device and determines the presence of the first interconnected mobile device and second interconnected mobile device in the first network based upon receipt of the broadcast.

16. An apparatus for coordinating telepresence among multiple interconnected devices, comprising:

a memory that stores information indicating multimedia capabilities, including the ability to capture any data of a particular type of media, of a first interconnected mobile device and a second interconnected mobile device in a first network and temporarily in a common definable space;

a signal receiver that receives signals indicating the temporary presence of the first interconnected mobile device and the second interconnected mobile device in the first network;

a tangible processor that determines, based upon receipt of the signals, multimedia capabilities, including the ability to capture any data of a particular type of media, of the first interconnected mobile device and the second interconnected mobile device from the information stored in the memory; and a transmitter that transmits signals selectively and temporarily enabling communications of a type of media information using one of the first interconnected mobile device and the second interconnected mobile device over a second network, and simultaneously and temporarily not enabling communications of the type of media information using the other of the first interconnected mobile device and the second interconnected mobile device over the second network, wherein the first interconnected mobile device and the second interconnected mobile device are temporarily and dynamically coordinated on-demand by the external controller during the temporary presence in the common definable space, and wherein the first interconnected mobile device and second interconnected mobile device are selected to transmit the type of media information based on a determination of which of the first interconnected mobile device and second interconnected mobile device has a power supply estimated to last a longest time.

17. The apparatus of claim 16,
wherein the apparatus is external to the first interconnected mobile device and the second interconnected mobile device, and communicates with the first interconnected mobile device and the second interconnected mobile device over the second network.

18. A method for coordinating telepresence among multiple interconnected devices, comprising:

determining the temporary presence of a first interconnected mobile device and a second interconnected mobile device;

determining multimedia capabilities of the first interconnected mobile device and the second interconnected mobile device;

coordinating, among the first interconnected mobile device and the second interconnected mobile device, the multimedia capabilities of the first interconnected mobile device and the second interconnected mobile device by selectively and temporarily enabling communications of a type of media information using the second interconnected mobile device, and simultaneously and temporarily not enabling communications of the type of media information using the first interconnected mobile device, wherein the first interconnected mobile device and the second interconnected mobile device are temporarily and dynamically coordinated on-demand by the external controller during the temporary presence in the common definable space, and wherein the first interconnected mobile device and second interconnected mobile device are selected to transmit the type of media information based on a determination of which of the first interconnected mobile device and second interconnected mobile device has a power supply estimated to last a longest time.

19. The method of claim 18,
wherein the first interconnected mobile device and the second interconnected mobile device communicate with one another and coordinate multimedia capabilities within a local network.

* * * * *